April 27, 1954   L. STEINFURTH   2,676,343
SLOTTING AND BURR REMOVING MACHINE
Filed March 10, 1951   3 Sheets-Sheet 1

INVENTOR.
LOUIS STEINFURTH
BY Hudson Boughton,
Williams, David & Hoffman
ATTORNEYS

INVENTOR.
LOUIS STEINFURTH

Patented Apr. 27, 1954

2,676,343

UNITED STATES PATENT OFFICE 2,676,343

SCREW SLOTTING AND BURR REMOVING MACHINE

Louis Steinfurth, East Cleveland, Ohio, assignor to The National Screw & Manufacturing Company, Cleveland, Ohio, a corporation of Ohio Application March 10, 1951, Serial No. 214,903

3 Claims. (Cl. 10—6)

The present invention relates to apparatus for removing burrs from the ends of articles, such as those sometimes formed on the ends of screws and the like during the sawing of the usual screw driver slots therein.

One of the principal objects of the invention is the provision of a novel and improved apparatus for removing burrs from the heads of headed articles and the like such as screws, wherein the articles to be de-burred are held in slots formed in one end or face of a rotating carrier by plate or guide means while they are rotated in cutting relationship with cutter means detachably connected to the rotatable carrier.

Another object of the invention is the provision of a novel and improved high speed apparatus for slotting headed and like articles, such as screw blanks, wherein the articles to be slotted are held in grooves or slots formed in one end or face of a rotating carrier by guide means while they are carried by rotation of the carrier past a circular saw eccentrically mounted within the carrier and which apparatus includes means adjacent to the path of travel of the articles after they have passed said saw for rotating the same about the axes of their shanks in cutting relationship with cutter means detachably connected to the carrier whereby any burrs formed incident to the slotting operation are removed and the cutting means can be readily replaced in the event of damage.

Further objects and advantages of the invention will be apparent to those skilled in the art to which it relates from the following description of the preferred embodiment described with reference to the accompanying drawings forming a part of this specification in which similar reference characters designate corresponding parts, and in which.

Figure 1:
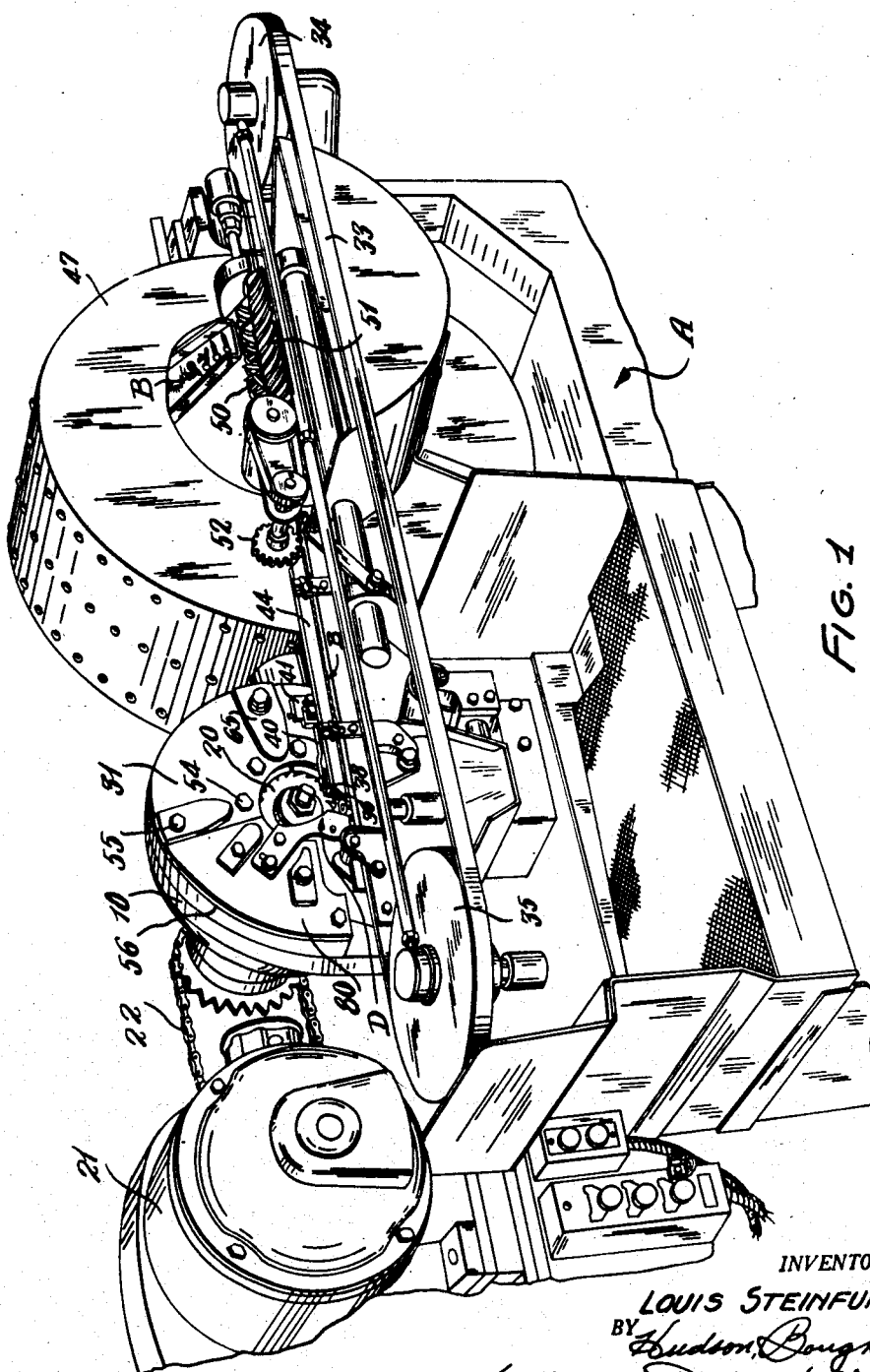
Fig. 1 is a perspective view of a machine for slotting headed screw blanks and embodying the present invention.
Figure 2:
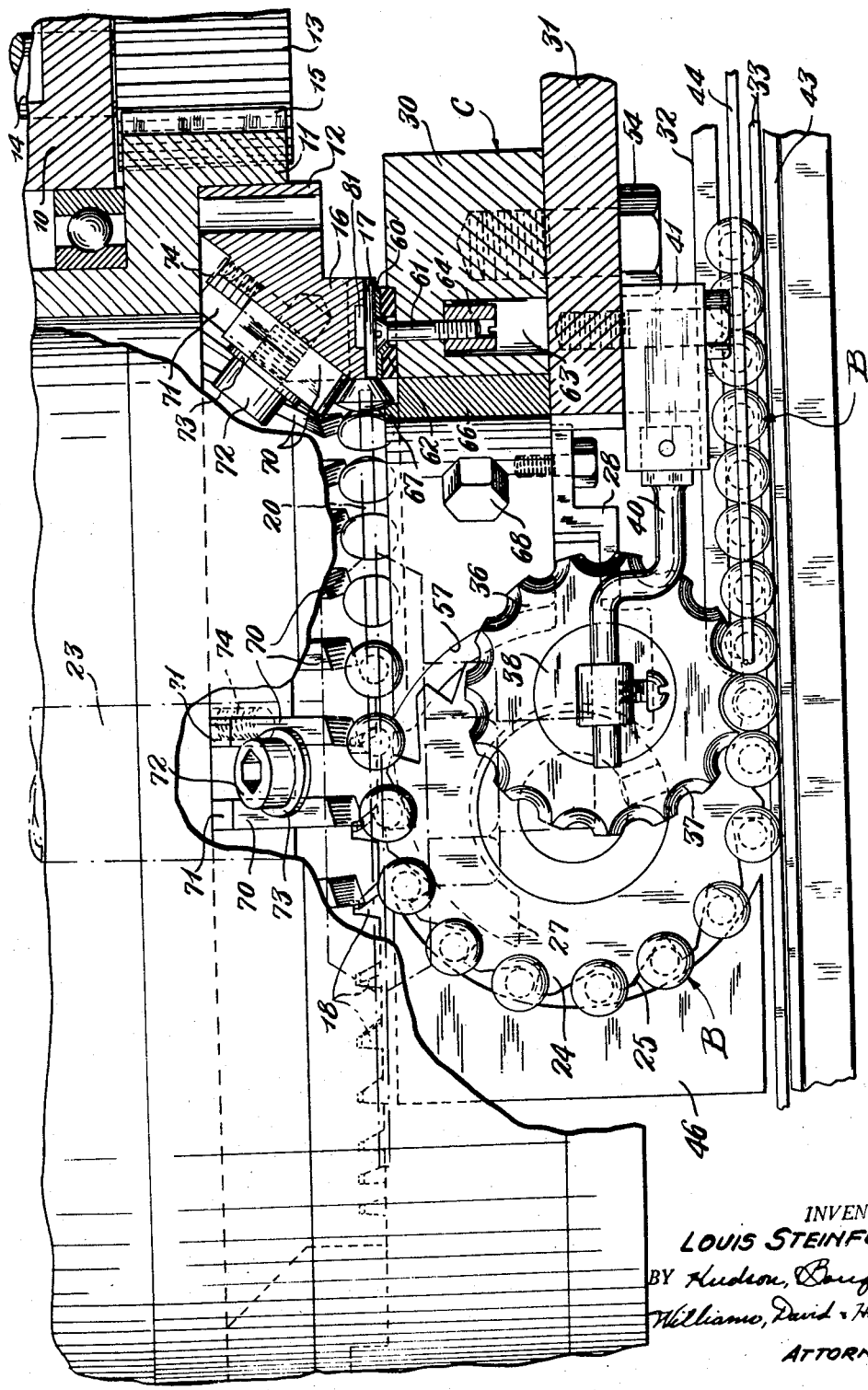
Fig. 2 is a fragmentary plan view with parts in section approximately through the center line of the carrier drum and with parts shown in dot dash lines.

Although it is to be understood that the invention may be otherwise embodied, it is herein illustrated and described as embodied in a machine especially designed for slotting relatively small (up to approximately ½" shank diameter) countersunk head type screw blanks. The machine illustrated is a high production machine being capable of slotting 1,000 blanks or more per minute.

Referring to the drawings, the machine shown therein comprises a base or frame A having a housing 10 including suitable bearings within which a tubular spindle 11 is supported having an article carrier or drum 12 secured to its forwardly projecting end. The tubular spindle and, in turn, the article carrier or drum 12 are supported by the housing 10 for rotation about a horizontal axis.

The carrier 12 is adapted to be driven in any suitable manner as by a pinion 13 connected to the forward end of a driven shaft 14 supported in the frame A for rotation about a horizontal axis, which pinion is continuously in mesh with gear teeth 15 cut on the periphery of the spindle 11. The carrier 12, as shown, has the general shape of a cylindrical ring or member open at its forward end and provided with a forwardly projecting annular flange 16 having a free radial face 17, the width of which is sufficient to properly hold the articles which the machine is designed to slot. The projecting end face 17 of the carrier 12 is provided with a series of radial slots or grooves 18 for receiving headed articles such as countersunk head type screw blanks B to be slotted and carrying them in a circular path past a circular saw 20 of slightly less diameter than the interior diameter of the flange 16 of the carrier 12.

The saw 20 is located within the carrier 12 and positioned eccentrically thereto so that the saw engages the heads of the blanks B only during a portion of their travel thereabout, leaving a portion of the path traveled by the slots 18 free for loading and unloading of the blanks. In the embodiment shown, the carrier 12 rotates in a counterclockwise direction, as viewed in Fig. 1, and the saw 20 is offset horizontally toward the right with respect to the axis of rotation of the carrier 12. The blanks are fed to the carrier at the bottom thereof and ejected therefrom approximately 270° later. This exact arrangement, however, is obviously not essential to the present invention.

The saw 20 may be driven in any convenient manner. As shown, it is driven from an electric motor 21 by a sprocket chain drive 22. The bearings for the spindle 23 upon which the saw is mounted are preferably so constructed that the axis of rotation of the saw can be adjusted horizontally to adjust the depth of cut to compensate for saw wear and permit the slotting of articles or blanks having heads of various shapes and sizes. The saw also has an axial adjustment for centering or properly locating the cut made thereby in the blank.

The articles or blanks to be slotted may be fed to the carrier 12 in any convenient manner. The feed means shown comprises a feed wheel 24 supported for rotation about a vertical axis and having a plurality of slots 25 in its rim or circumference within which the articles are suspended by their heads as they are conveyed to the carrier 12. The axis of the feed wheel 24 intersects the axis of the carrier 12 and is spaced forwardly of the carrier 12 such that the rim of the feed wheel 24 just clears the face 17 of the flange 16 of the carrier 12 with the upper surface of the feed wheel, substantially level or flush with the internal surface of the flange 16 of the carrier 12 at the bottom of the carrier.

The slots 25 of the feed wheel 24 are spaced from each other any suitable distance and the feed wheel is rotated in any convenient manner but in timed relation to the rotation of the carrier 12 so that when both members are rotating the slots in the respective members sequentially align with one another. The slots 25 may be of any suitable shape, such as the ratchet tooth form shown. The feed wheel 24 has a groove 26 in its periphery for the reception of a stationary plow-like member 27 which pushes the blanks B from the slots 25 in the feed wheel 24 and into the slots 18 in the carrier 12 aligned therewith incident to the rotation of the feed wheel 24. The plow-like member 27 is connected by a bracket 28 to an arcuately-shaped member 30, which member is in turn connected by a plate-like member 31 to the stationary housing 10 previously referred to.

The blanks B may be fed to the wheel 24 in any convenient manner. As shown, they are fed into the slots 25 in the feed wheel 24 by a conveyor comprising a stationary bar 32 spaced from a traveling endless band 33 encircling pulleys 34, 35 rotating about vertical axes, one of which pulleys is driven at a suitable speed. The construction is such that the blanks B are suspended by their heads from the bar 32 and the upper edge of the band 33 and move toward the feed wheel 24 by the engagement of their heads with the upper edge of the band 33 assisted by the engagement of their shanks with the flat vertical face of the traveling band. The discharge end of the bar 32 terminates just short of the feed wheel 24 and the traveling band 33 passes thereby substantially tangent thereto. This construction results in a blank being picked off of the conveyor formed by the stationary bar 32 and traveling band 33 each time a slot or tooth in the feed wheel 24 passes the open end of the conveyor.

In the present instance, the blanks B being of the countersunk head type do not always ride in the conveyor formed by the stationary bar 32 and the traveling band 33 with their shanks hanging exactly vertically, with the result that they may not properly enter the slots 25 of the feed wheel 24. In order to assure that the blanks are in correct position to properly enter the slots 25, a small wheel 36 is provided immediately above the feed wheel 24 and having its periphery approximately tangent to the center line of the conveyor at the end of the stationary bar 32.

The wheel 36 is provided with a plurality of tapered grooves 37 in its circumference and into which the heads of the blanks B are received as the blanks leave the end of the bar 32. The inclination or bevel of the grooves 37 corresponds to that of the underside of the heads of the blanks B, with the result that as the blanks B leave the bar 32 they hang in the grooves 37, being held therein by the movable belt 33, with the result that they straighten up in the event they have been in some other position. The wheel 36 is rotatably supported on the lower end of a spindle 38, the upper end of which is adjustably connected to an arm 40 pivotally connected to a bracket 41 for rotation about a vertical axis. A spring 42 interposed between the arm 40 and the bracket 41 yieldably urges the wheel 36 toward the movable band 33 with a slight pressure. The wheel 36 is not driven but is caused to rotate by the movement of the blanks B. A stationary bar 43 within the band 33 prevents the band from flexing inwardly and dropping the blanks therebetween and the bar 32. A stationary bar 44 adjustably supported above the conveyor assists in preventing the blanks therein from riding up upon one another.

The blanks B are initially retained in the slots 25 of the feed wheel by the band 33 and are subsequently retained therein by a stationary member 46 which extends from the band 33 to the face 17 of the flange 16 of the carrier. The stationary member 46 is fixedly connected to a stationary part of the machine.

The blanks B may be fed to the conveyor formed by the stationary bar 32 and the traveling band 33 in any convenient manner. In the present instance this mechanism includes a rotating hopper 47 which discharges a continuous stream of blanks onto two parallel, oppositely rotating rollers 50, 51 having helical grooves or threads in their circumference, which rollers cooperate in aligning the blanks and locating them in the conveyor. A driven star or ratchet wheel 52 located above the conveyor adjacent to the discharge end of the rollers 50, 51 removes any blanks on the conveyor not properly positioned therein.

After the blanks B have been fed to the carrier 12 they are carried thereby past the saw 20 which cuts the conventional screw driver slots in their heads. The slots 18 in the carrier 12 are preferably ratchet tooth-like in shape with the rear or trailing side or face which pushes the blanks past the saw, etc., making an angle of approximately 76° with the face of the carrier. The other side or face of the slots makes an angle of about 40° with the face of the carrier. This type of slot has been found very effective. The blanks are carried in their circular path free from rotation about the axis of their shanks until they reach the rotating means hereinafter referred to.

As the blanks B leave the loading station at the bottom of the carrier, they are held in the slots 18 by a suitable arcuately-shaped guide member or pressure plate, designated generally by the reference character C. The guide member C shown is claimed in my copending application Serial No. 214,902, filed March 10, 1951, and includes the member 30, previously referred to, which member is secured as by the bolts 54 to the rear side of the plate-like member 31 along its radial inner edge. The radial outer edge of the member 31 is connected to the housing 10 by the bolts 55. An arcuately-shaped member interposed between the housing 10 and the plate-like member 31 spaces the latter a desired distance from the housing. The lower end of the member 30 is curved as at 57 and conforms closely to the periphery of the feed wheel 24 so that the blanks B as they move away from the trailing end of the plow member 27 are engaged by the pressure plate or guide member C and are held thereby within their respective slots 18 during the cutting operation.

The guide or pressure plate member C, in addition to comprising the member 30, includes an arcuately-shaped piece of thin spring steel or like material 60 located adjacent to the rear face of the member 30 along the radially inner edge, which member engages the shanks of the blanks B as they are carried in their circular path by rotation of the carrier 12. The relatively thin flexible steel-like member 60 is separated from the member 30 to which it is movably connected by screws 61 by a piece of rubber-like material 62. The forward ends of the screws 61 project into apertures 63 in the member 30 where they have nuts 64 secured thereon. The construction is such that the thin flexible member 60 can yield relative to the member 30 and provides a yieldably engaging surface for the shanks of the blanks B, thus holding the blanks securely in their relative slots 18 even though there may be a slight variation in the size of the diameters of the shanks of the blanks.

The plate 31 to which the guide member or pressure plate assembly C is connected has a limited amount of resiliency and its radial inner end is biased toward the face 17 of the carrier 12 so as to urge the pressure plate assembly C into engagement with the shanks of the blanks B. In the embodiment shown, the plate-like member 31 is relatively flexible and is stiffened by resilient members 65, the outer ends of which are located underneath the heads of the bolts 55 while the inner ends project toward the radially radially inner edge of the member 31. In order to assist in axially positioning the blanks B properly in the carrier 12, a guide 66 having a flange 67 which projects over the heads of the blanks is bolted to the inner face of the member 30 as by a bolt 68. The lower end of the guide 66 is curved to conform to the curvature 57 of the lower end of the member 30 and the lower end of the flange 67 is tapered to facilitate entrance of the heads of the blanks B therebeneath.

During the cutting of the slots in the heads of the blanks B, a small burr may be formed on the head. This is particularly objectionable in the case of countersunk head type screws as the burr occurs on the under or bearing side of the head. According to the provisions of the present invention, these burrs, when formed, are removed by cutter means detachably connected to the carrier 12 so that they can be adjusted and replaced when worn or broken. In the embodiment shown, a cutting blade 70 is connected to the carrier 12 adjacent to each of the slots 18. The blades 70 are located in grooves 71 in the carrier, which grooves diverge rearwardly from adjacent to the radially inner ends of the slots 18. Screws 72 threaded into tapped apertures in the carrier 12 intermediate alternate grooves 71 are provided with washers 73 which overlie the two cutting blades 70 adjacent thereto and hold them in position. The cutting edges of the cutting blades 70 are ground to the inclination or bevel of the undersides of the heads of the blanks and the blades are adjusted lengthwise of the grooves 71 by screws 74 threaded into tapped apertures in the carrier opening into the bottoms of the grooves 71 so that the screws 74 therein can abut the ends of the cutting blades 70. The cutting blades 70 are normally adjusted to a position where their cutting edges engage the underside of the heads of the blanks, that is, to a position where they will remove any burr formed on the underside of the head when they are individually rotated in their respective slots 18, as will be hereinafter described.

Figure 3:
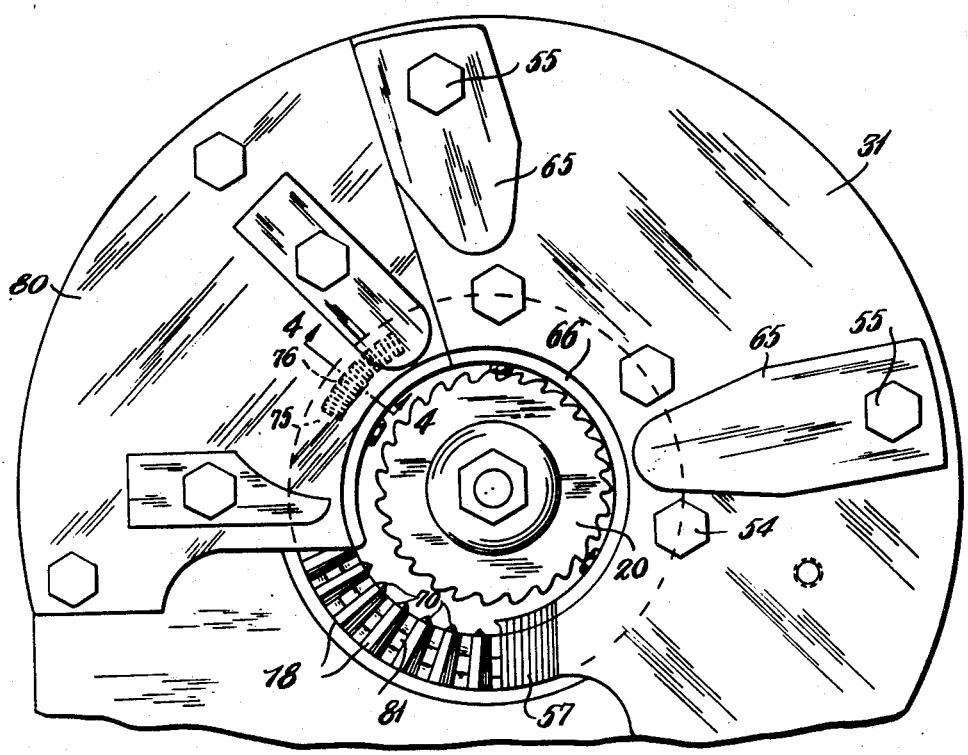
Fig. 3 is a fragmentary elevational view with parts omitted.
Figure 4:
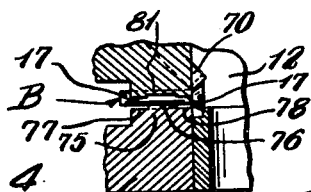
Fig. 4 is a fragmentary sectional view approximately on the line 4—4 of Fig. 3.
Figure 5:
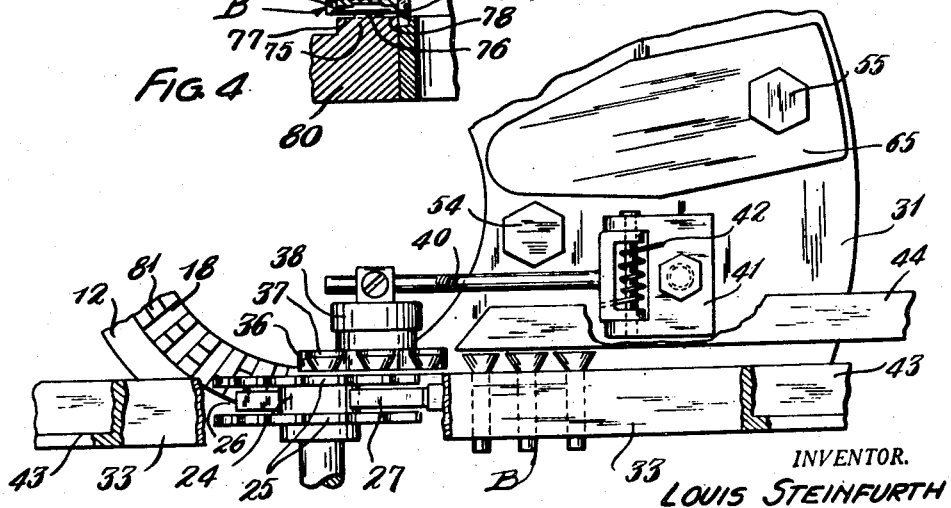
Fig. 5 is an enlarged elevational view with portions broken away looking from the bottom of Fig. 2.

While the blanks B are traveling behind and in engagement with the guide C which is co-extensive with the plate 31, no rotation of the blanks relative to the carrier occurs. After they pass from behind the plate 31 however, their shanks are engaged by a flanged member 75 somewhat similar to the member C but which differs therefrom in that it causes the blanks to rotate in their slots 18 as they pass thereby or by a part thereof. Referring particularly to Figs. 3 and 4, the flanged member 75 has an arcuately-shaped knurled or serrated portion 76 of less width than the width of the face 17 of the carrier 12 and projecting slightly to the rear of the flanged surfaces 77, 78 adjacent thereto. As the blanks B are carried through that portion of their path of travel adjacent to or spanned by the knurled or serrated portion 76 of the flanged member 75, their shanks are engaged thereby, with the result that the blanks are rotated in their grooves 18 in cutting relationship with the blade 70 adjacent thereto. This relative rotation between the blanks and cutting blades removes any burr present from the underside of the heads of the blanks.

The flanged member 75 is formed integral with the rear, radially inward side of a plate 80, somewhat similar to the plate 31, which biases or yieldably urges the flanged member 75 toward the carrier 12. The face 17 of the carrier is relieved as at 81 so that the smooth surfaces 77, 78 and not the knurled or serrated surface will rub thereagainst when there are no blanks in the carrier.

As the blanks pass from behind the plate 80, they are ejected from the carrier 12 by a mechanism forming no part of the present invention but designated generally by the reference character D.

The invention is principally concerned with the removal of burrs from the heads of screws formed incident to the cutting of the slots and can be incorporated in a machine, such as the machine shown, which also cuts the slots in the heads of the blanks or it may be a machine which merely removes burrs from blanks slotted in some other machine. The machine illustrated could be converted to such a machine by removing the saw. In this event, it would probably be preferable to substitute a member having serrations, etc. in place of the guide C so that the blanks would be rotated throughout a greater part of their path of travel.

From the foregoing description of the preferred embodiment, it will be apparent that the objects of the invention heretofore enumerated and others have been accomplished and that there has been provided a new and improved machine for removing burrs from the ends of articles such as screw blanks wherein the articles to be deburred are held in slots formed in the face of a rotating carrier by guide means while they are moved in a circular path and wherein during at least a portion of their travel they are rotated in cutting relationship with cutting means detachably connected to the carrier so that the cutting means can be readily replaced in the event it is damaged, etc.

While the invention has been described with considerable detail, it is not limited to the particular construction shown and it is my intention to cover hereby all adaptations, modifications and uses thereof which come within the practice of those skilled in the art to which it relates and within the scope of the appended claims.

Having thus described my invention, I claim:

1. In a screw and like slotting machine, an annular rotatable carrier having a plurality of radial slots therein adapted to receive blanks, means for rotating said carrier whereby said radial slots are moved in a circular path, means adapted to feed blanks into said radial slots adjacent to one side of said circular path, means for removing blanks from said radial slots in said carrier, means adjacent to said path intermediate said loading station and the unloading station for engaging and rotating the shanks of blanks carried therepast by said carrier, fixed abutment means adapted to overlie the heads of blanks in said carrier and limit axial movement thereof as they are rotated in said carrier, cutters removably mounted in grooves in said carrier adjacent to each of said radial slots and in cutting relation to the blanks therein for removing burrs projecting therefrom, the grooves in said carrier each having its longitudinal axis diverging from a point adjacent to the radially inner ends of the corresponding radial slots, and means for adjusting said cutter means toward or from said abutment means.

2. In a screw and like slotting machine, an annular rotatable carrier having a plurality of radial slots therein adapted to receive blanks, means for rotating said carrier whereby said radial slots are moved in a circular path, means adapted to feed blanks into said radial slots adjacent to one side of said circular path, a cutting tool adapted to cut slots in the ends of blanks carried therepast by said carrier, means for retaining blanks in said radial slots while engaged by said cutter, means for removing blanks from said radial slots in said carrier, means adjacent to said path intermediate said cutter and the unloading station for engaging and rotating the shanks of blanks carried therepast by said carrier, fixed abutment means adapted to overlie the heads of blanks in said carrier and limit axial movement thereof as they are rotated in said carrier, cutters removably mounted in grooves in said carrier adjacent to each of said radial slots and in cutting relation to the blanks therein for removing burrs projecting therefrom, said grooves have their longitudinal axes diverge from a point adjacent to the inner ends of said radial slots, and means for adjusting said cutter means toward or from said abutment means.

3. In a screw and like slotting machine, an annular rotatable carrier having a plurality of radial slots in one end or face adapted to receive blanks, means for rotating said carrier whereby said radial slots are moved in a circular path, means adapted to feed blanks into said slots adjacent to one side of said circular path, a cutting tool rotatable within said carrier about an axis offset with respect to the axis of rotation of said carrier and adapted to cut slots in the ends of blanks carried therepast by said carrier, means adjacent to said face of said carrier having said radial slots therein adapted to engage the shanks of blanks in said radial slots and retain the same therein while engaged by said cutter, means for removing blanks from said slots in said carrier, means adjacent to said path intermediate said cutter and the unloading station for engaging and rotating the shanks of blanks carried therepast by said carrier, fixed abutment means adapted to overlie the heads of blanks in said carrier and limit axial movement thereof as they are rotated in said carrier, cutters removably mounted in grooves in said carrier adjacent to each of said radial slots and in cutting relation to the blanks therein for removing burrs projecting therefrom, said grooves each having their longitudinal axes diverging from a point adjacent to the inner ends of the corresponding radial slots, and means for adjusting said cutter means toward or from said abutment means.

References Cited in the file of this patent

UNITED STATES PATENTS

| Number | Name | Date |
|---|---|---|
| 1,531,240 | Wilcox | Nov. 21, 1950 |

FOREIGN PATENTS

| Number | Country | Date |
|---|---|---|
| 379,262 | Germany | Aug. 20, 1923 |
| 591,245 | Germany | Jan. 18, 1934 |
| 597,253 | Germany | May 19, 1934 |